United States Patent
McHugh

(10) Patent No.: US 7,184,136 B2
(45) Date of Patent: Feb. 27, 2007

(54) OPTICAL ALIGNMENT METHOD AND SYSTEM

(75) Inventor: Steve McHugh, Santa Barbara, CA (US)

(73) Assignee: Santa Barbara Infrared, Inc., Santa Barbara, CA (US)

( * ) Notice: Subject to any disclaimer, the term of this patent is extended or adjusted under 35 U.S.C. 154(b) by 3 days.

(21) Appl. No.: 11/114,465

(22) Filed: Apr. 25, 2005

(65) Prior Publication Data

US 2005/0237517 A1  Oct. 27, 2005

Related U.S. Application Data

(60) Provisional application No. 60/565,993, filed on Apr. 27, 2004.

(51) Int. Cl.
*G01B 11/26* (2006.01)

(52) U.S. Cl. ............................... 356/152.3; 356/152.2; 356/153; 356/138

(58) Field of Classification Search ............. 356/152.2, 356/125.3, 153, 152.3, 138, 139.04, 139.06
See application file for complete search history.

(56) References Cited

U.S. PATENT DOCUMENTS

| | | | | |
|---|---|---|---|---|
| 3,628,868 A | 12/1971 | Starkey | ....................... | 356/152 |
| 3,725,576 A | 4/1973 | Crawford | ..................... | 178/6.8 |
| 3,752,587 A | 8/1973 | Meyers et al. | .............. | 356/153 |
| 3,942,894 A * | 3/1976 | Maier | .......................... | 356/153 |
| 4,155,096 A | 5/1979 | Thomas et al. | ............. | 358/125 |
| 4,422,758 A * | 12/1983 | Godfrey et al. | .......... | 356/152.1 |
| 5,506,675 A * | 4/1996 | Lopez et al. | .............. | 356/152.1 |
| 5,672,872 A | 9/1997 | Wu et al. | .................... | 250/330 |
| 5,719,671 A * | 2/1998 | Runciman | .................... | 356/153 |
| 5,734,466 A | 3/1998 | George et al. | ............ | 356/141.3 |
| 5,838,014 A | 11/1998 | Cabib et al. | ............ | 250/504 R |
| 6,211,951 B1 * | 4/2001 | Guch, Jr. | .................. | 356/152.1 |
| 6,356,348 B1 * | 3/2002 | Lysen et al. | ................. | 356/450 |
| 6,734,448 B2 | 5/2004 | Kongable | ............... | 250/504 R |

* cited by examiner

*Primary Examiner*—Gregory J. Toatley, Jr.
*Assistant Examiner*—Roy M. Punnoose
(74) *Attorney, Agent, or Firm*—Koppel, Patrick, Heybl & Dawson

(57) ABSTRACT

An optical feedback technique is utilized for accurately determining the angular orientation of a collimator relative to an electro-optical (EO) system, and for aligning the two. A mirror assembly mounted on the EO system comprises a plurality of mirror elements positioned to receive light from the exit aperture of the collimator and to reflect the light back into the collimator through the aperture, each of the mirror elements having a reflecting surface oriented at a predetermined, unique angle. A beam of light reflected from one of the plurality of mirror elements forms a light spot on a photosensitive surface at the focal plane of the collimator. The relative orientation of the collimator and the EO system is determined by comparing the position of the light spot on the photosensitive surface with a reference position. An error signal is generated based on the comparison of the position of the light spot with the reference position, and in response to the error signal, the orientation of the collimator is adjusted relative to the EO system to align the optical axes thereof.

22 Claims, 6 Drawing Sheets

| MIRROR DESIGNATION | AZIMUTH ANGLE IN DEGREES (mrad) | ELEVATION ANGLE IN DEGREES (mrad) |
|---|---|---|
| 150.1 | 0 (0) | 0 (0) |
| 150.2 | 0 (0) | 0 (0) |
| 150.3 | -1.6 (-27) | +1.6 (+27) |
| 150.4 | -0.5 (-9) | +1.6 (+27) |
| 150.5 | +0.5 (+9) | +1.6 (+27) |
| 150.6 | +1.6 (+27) | +1.6 (+27) |
| 150.7 | -1.6 (-27) | +0.5 (+9) |
| 150.8 | -0.5 (-9) | +0.5 (+9) |
| 150.9 | +0.5 (+9) | +0.5 (+9) |
| 150.10 | +1.6 (+27) | +0.5 (+9) |
| 150.11 | -1.6 (-27) | -0.5 (-9) |
| 150.12 | -0.5 (-9) | -0.5 (-9) |
| 150.13 | +0.5 (+9) | -0.5 (-9) |
| 150.14 | +1.6 (+27) | -0.5 (-9) |
| 150.15 | -1.6 (-27) | -1.6 (-27) |
| 150.16 | -0.5 (-9) | -1.6 (-27) |
| 150.17 | +0.5 (+9) | -1.6 (-27) |
| 150.18 | +1.6 (+27) | -1.6 (-27) |

OPTICAL ALIGNMENT METHOD AND SYSTEM

CROSS REFERENCE TO RELATED APPLICATION

This application claims the benefit of U.S. Provisional Application No. 60/565,993 filed on Apr. 27, 2004, which provisional application is incorporated herein by reference in its entirety.

FIELD OF THE INVENTION

The present invention relates generally to optical systems, and particularly to the alignment or boresighting of such systems.

BACKGROUND OF THE INVENTION

Electro-optic (EO) systems are generally integrated with higher level systems that provide various functions such as navigational and/or targeting capabilities. An EO system typically comprises several optical subsystems or devices each of which transmits and/or receives light along an optical axis. For example, an EO system in the form of a multispectral forward-looking infrared (FLIR) system may have several subsystems including, for example, an IR imaging device, a laser rangefinder, a laser designator and a visible CCD camera. To provide reliable operation, the optical axes of the subsystems must be accurately aligned relative to each other and to a reference axis that can be related to the higher level system in which the EO system is to be used.

Alignment of the optical axis of an optical device has been traditionally performed by making mechanical boresighting adjustments. For example, in U.S. Pat. No. 3,628,868, a laser boresighting device is disclosed that provides alignment by means of manual micrometer adjustments. However, the accuracy of such adjustments can be adversely affected by backlash or human error, among other factors. A laser designator system utilizing automatic mechanical adjustments to achieve alignment is disclosed in U.S. Pat. No. 4,155,096. The adjustments are made in response to the movement of a gimbaled mirror. However, the alignment accuracy is limited by the accuracy with which the gimbaled mirror can be mechanically positioned, which may be affected by vibrations or other extraneous disturbances.

SUMMARY OF THE INVENTION

Rather than using conventional mechanical feedback, the present invention provides a method and a system for accurately aligning an EO system by means of an optical feedback technique. More specifically, the present invention provides an accurate and continuous optical feedback technique for determining the angular orientation of an EO system relative to a collimator and for aligning the two.

In accordance with one specific, exemplary embodiment of the invention, there is provided a method of aligning an electro-optical (EO) system with a collimator, the EO system and the collimator each having an optical axis. The method comprises the steps of illuminating a plurality of mirror elements with light from the collimator, each of the plurality of mirror elements being oriented so as to reflect light from the collimator at a predetermined, unique angle relative to the optical axis of the EO system; directing a beam of light reflected from one of the plurality of mirror elements to form a light spot on a photosensitive surface; and determining the relative orientation of the optical axes of the collimator and the EO system by comparing the position of the light spot on the photosensitive surface with a reference position.

The method further comprises the steps of generating an error signal based on the comparison of the position of the light spot with the reference position, and adjusting the orientation of the collimator relative to the EO system to align the optical axes thereof in response to said error signal. Alternatively, in response to the error signal, the orientation of the EO system may be adjusted relative to the collimator to provide the alignment.

In accordance with another specific, exemplary embodiment of the invention, there is provided a method of aligning an electro-optical (EO) system with a collimator, the EO system and the collimator each having an optical axis. The method of this embodiment comprises the steps of illuminating a plurality of mirror elements with light from the collimator, each of the plurality of mirror elements being oriented so as to reflect light from the collimator at a predetermined, unique angle relative to the optical axis of the EO system; directing a beam of light reflected from one of the plurality of mirror elements to produce a light spot on a photosensitive surface; determining the approximate angular orientation of the optical axis of the collimator relative to the optical axis of the EO system by determining which one of the plurality of mirror elements is producing the light spot on the photosensitive surface; determining more precisely the angular orientation of the optical axis of the collimator relative to the optical axis of the EO system by comparing the position of the light spot on the photosensitive surface with the position of a reference light spot on the photosensitive surface, generating an error signal based on the comparison, and in response to the error signal, adjusting the angular orientation of the collimator relative to the EO system to align the optical axes thereof, with the goal of reducing the magnitude of the error signal to zero.

Pursuant to yet another specific, exemplary embodiment of the invention, there is provided a system for optically aligning an electro-optical (EO) apparatus relative to a collimator, the collimator being adapted to project collimated light through an exit aperture and for receiving light through that aperture. The system comprises a mirror assembly mounted on the EO apparatus, the mirror assembly comprising a plurality of mirror elements positioned to receive light from the exit aperture of the collimator and to reflect the light back into the collimator through the aperture. Each of the mirror elements has a reflecting surface oriented at a predetermined, unique angle. The system further includes an actuator for displacing the collimator and the EO system relative to each other, a camera having a photosensitive surface positioned at a focal plane of the collimator, a light source, and a computer connected to control the actuator and to receive signals from the camera. The collimator is adapted to direct light from the light source through the exit aperture of the collimator to illuminate the plurality of mirror elements of the mirror assembly, light reflected from at least one of the mirror elements being incident as a light spot on the photosensitive surface of the camera. The computer is adapted to (1) compare the position of the light spot on the photosensitive surface with a reference position, (2) generate an error signal based on the comparison, and (3) align the collimator and the EO apparatus by driving the actuator in response to the error signal with the goal of reducing the magnitude of the error signal to zero.

In accordance with yet another aspect of the present invention, there is provided a mirror assembly comprising a support structure defining a surface and an aperture, the aperture having an axis normal to the surface. The mirror assembly includes a plurality of mirror elements mounted on the surface of the support structure, each of the plurality of mirror elements being oriented so as to reflect light from a light source at a predetermined, unique angle relative to the axis. In one form of the mirror assembly, the support structure comprises a frame, preferably in the form of a ring in which case the axis of the aperture comprises the central axis of the ring.

BRIEF DESCRIPTION OF THE DRAWINGS

The foregoing and other features, objects and advantages of the invention will be apparent from the detailed description, below, which refers to the accompanying drawings in which.

DETAILED DESCRIPTION OF THE INVENTION

Figure 1:
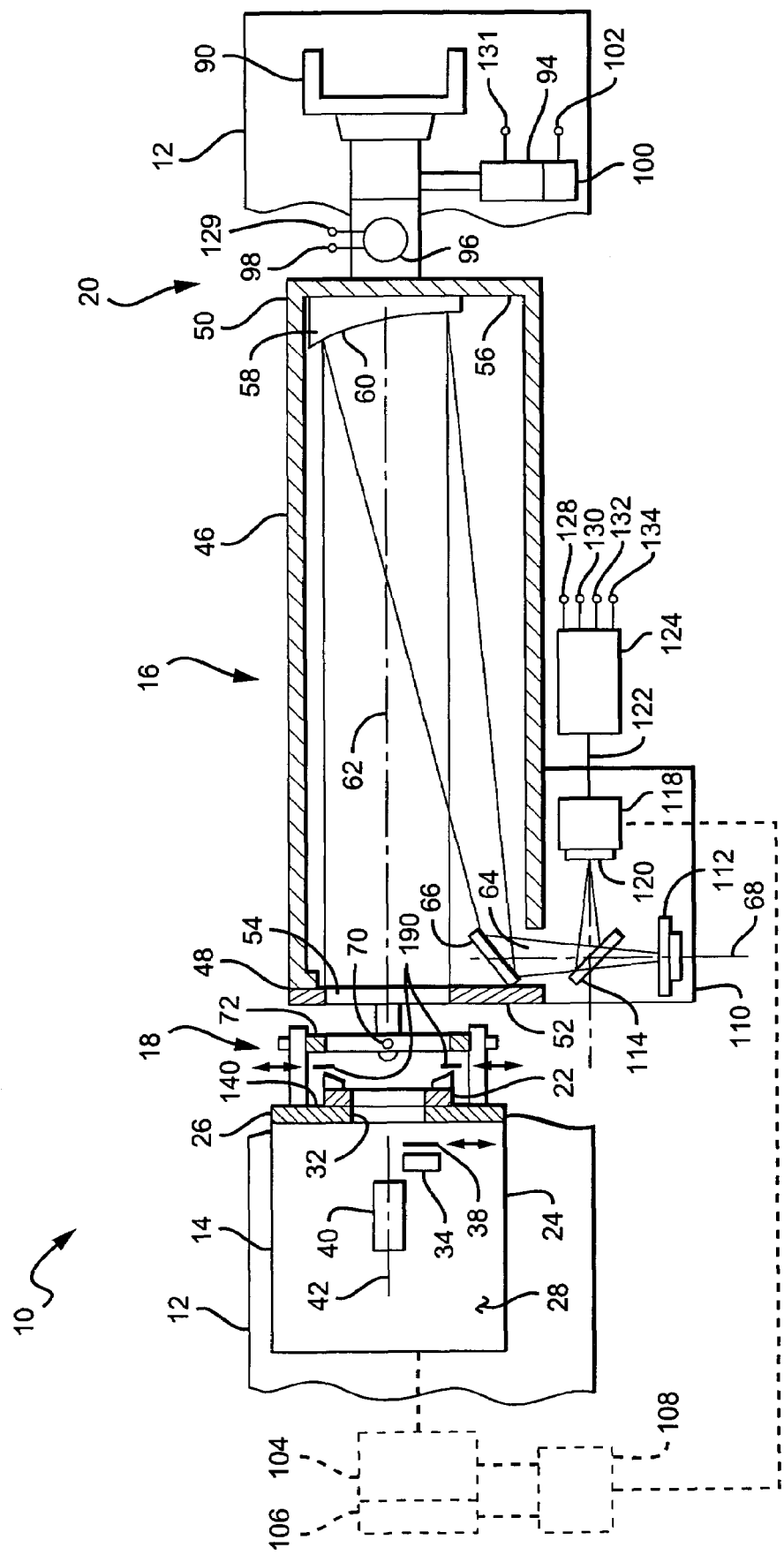
FIG. 1 is a schematic top plan view, partly in cross section, of an optical alignment system in accordance with one specific, exemplary embodiment of the invention.

The following description is of a best mode presently contemplated for practicing the invention. This description is not to be taken in a limiting sense but is made merely for the purpose of describing the general principles of the invention whose scope may be ascertained by referring to the appended claims. In the description of the invention that follows, like reference numerals or designators are used to refer to like parts or elements throughout.

FIGS. 1–4 show an optical alignment system 10 in accordance with one specific, exemplary embodiment of the invention. The purpose of the optical alignment system 10 is to align an EO system or apparatus (also referred to in the art as the unit under test or UUT) preparatory to subjecting the EO system to one or more specific performance tests or test sequences, and to assure that the EO system will be accurately aligned relative to a higher level system into which the EO system is to be installed.

The system of the present invention may be used in a variety of ways but this description highlights its use for testing multi-spectral EO (FLIR, visible, and laser) systems. An optical collimator is generally used to test such a system. A variety of targets are projected through the collimator and presented to the EO system to evaluate performance and align all of the subsystems. However, collimators useful for such testing typically have narrow fields of view. Accordingly, testing all of the subsystems in succession involves moving the collimator and the EO system relative to each other. Having accurate knowledge of the movement of one relative to the other is critical to testing and especially critical to the alignment of all of the subsystems.

The optical alignment system 10 is mounted on a fixed base 12 and includes an EO system 14, a collimator 16, a coupler 18 interconnecting the EO system 14 and the collimator 16, an actuator 20 for angularly displacing the collimator relative to the EO system, and a multi-element mirror assembly 22.

The EO system 14 is mounted on a support 24 secured to the fixed base 12. The support 24 comprises a vertical front wall 26 and a horizontal bottom wall 28. The bottom wall 28 defines a lower reference surface 30 engaging the fixed base 12. The reference surface 30 is adapted to mate with a corresponding surface on a higher level assembly in which the EO system is to be installed. The front wall 26 defines a circular aperture 32, having a central axis 33, for passing light to and from the collimator 16. Fixedly mounted on the bottom wall 28 of the EO system 14 is a reference mirror 34 having a front reflecting surface 36 positioned to receive light passing through the aperture 32 in the front wall. The reflecting surface 36 of the reference mirror 34 is positioned so that it is perpendicular to the axis 33. Thus, the mirror 34 defines the optical line of sight or axis of the EO system. Light directed toward the reference mirror 34 through the aperture 32 may be selectively blocked by a movable shutter 38.

Figure 2:
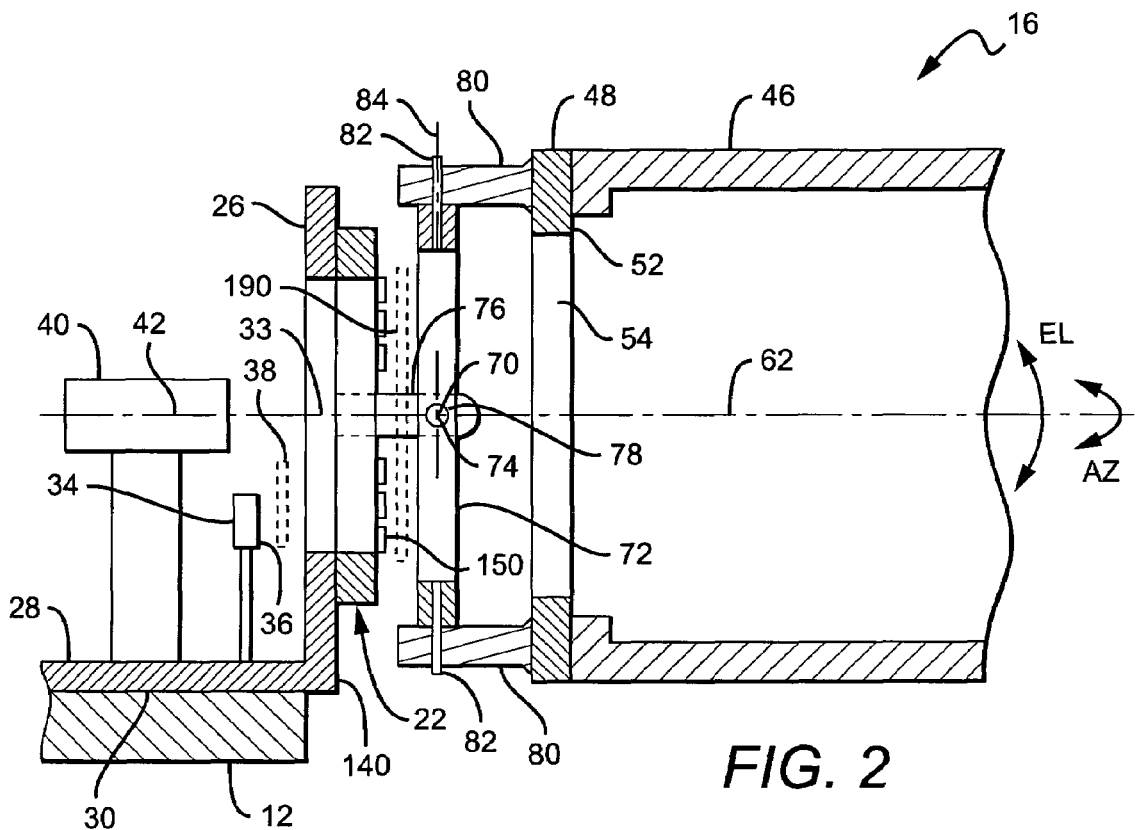
FIG. 2 side elevation view, in cross section, of a portion of the optical alignment system shown in FIG. 1.
Figure 4:
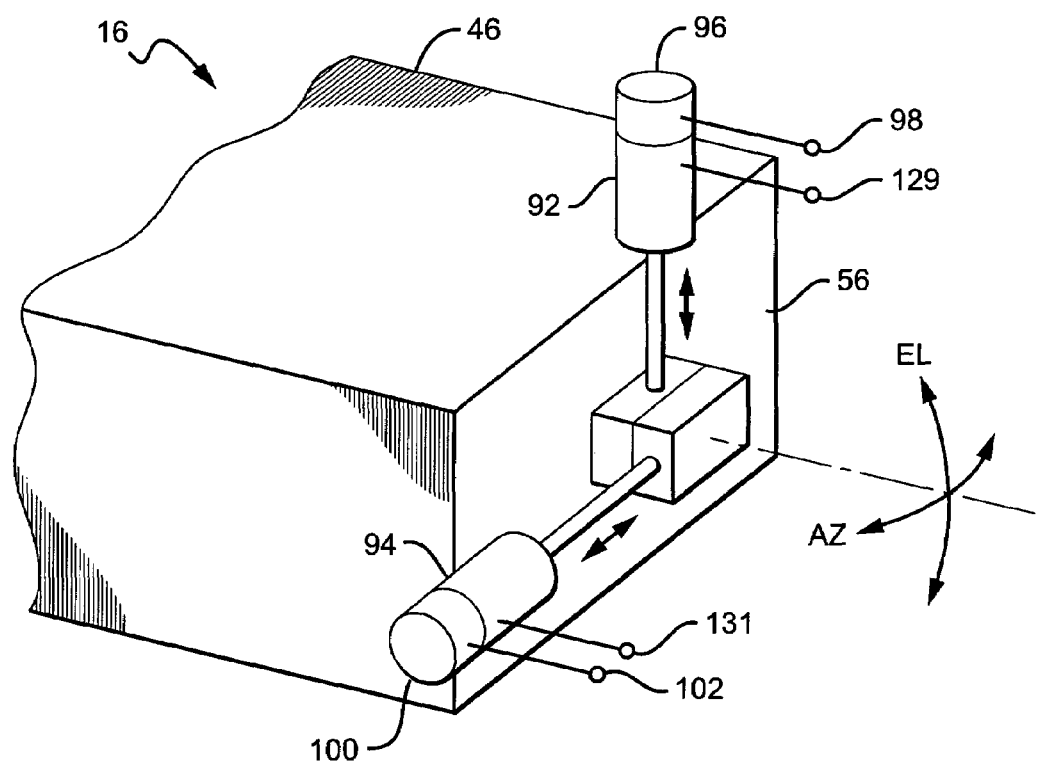
FIG. 4 is a perspective view of another portion of the optical alignment system shown in FIG. 1.
Figure 3:
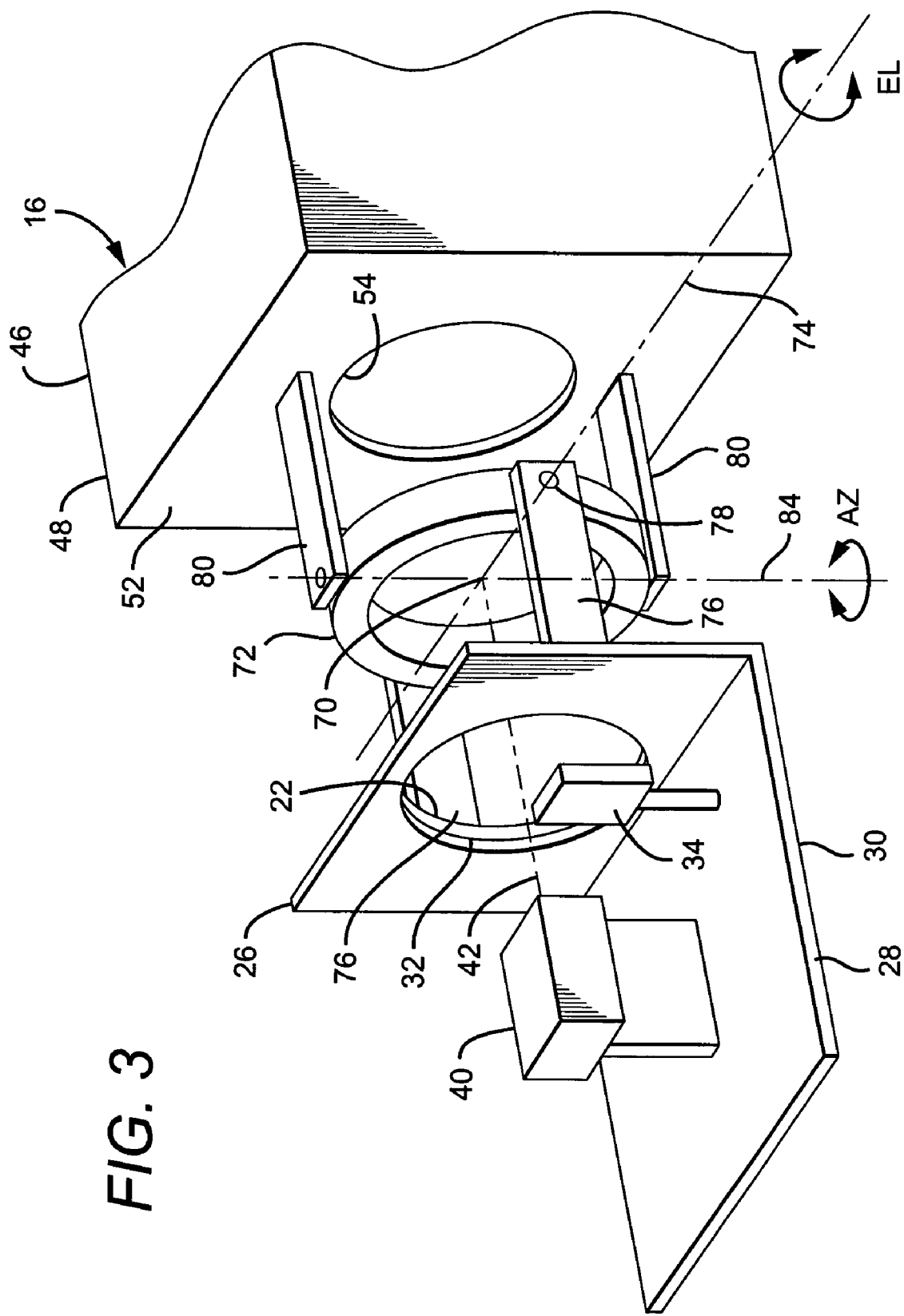
FIG. 3 is a perspective view of the portion of the optical alignment system of the invention shown in FIG. 2.

The EO system 14 may comprise one or more optical subsystems. By way of example, the EO system may comprise a multispectral FLIR system incorporating a laser designator, a laser rangefinder, an IR imaging device and a visible light CCD camera. In FIGS. 1–3, a single subsystem, for example, a laser designator 40, is shown by way of illustration. The laser designator 40 has an optical axis 42 along which the laser beam of the designator is projected.

In accordance with the specific embodiment shown in the drawings, the collimator 16 may comprise a conventional all reflective, off-axis design free from obscuration. It will be evident, however, that although the use of a reflective collimator is preferred, the collimator may instead comprise a refractive rather than a reflective unit. The collimator 16 comprises a housing 46 having opposite ends 48 and 50. The end 48 includes a transverse wall 52 defining a circular exit aperture 54 while the end 50 is closed by a transverse wall 56. The inner surface of the end wall 56 supports a primary mirror 58 typically having a highly reflective, curved surface 60 that may comprise, by way of example, a diamond-turned, appropriately coated paraboloid conic or higher order aspheric shape. The collimator has an optical line of sight or axis 62 about which the exit aperture 54 is concentrically positioned. The collimator housing 50 has a side window 64 adjacent to the end wall 52. A flat, secondary mirror 66 is positioned proximate the side window 64 off-axis with respect to the optical axis 62 of the collimator. The secondary mirror 66 is oriented so as to direct light reflected from the primary mirror along an axis 68 typically perpendicular or nearly perpendicular to the collimator's optical axis 62. Light incident upon the primary mirror from the secondary mirror is reflected from the primary mirror, the collimated rays being directed toward the exit aperture 54 of the collimator, in a well-known fashion.

The collimator 16 is supported at the end 48 by the coupler 18 that allows the collimator to pivot about a point 70 that, in the example shown, lies within the confines of the coupler. The coupler 18 may take various forms; by way of example, the coupler 18 may be in the form of a universal joint comprising a transverse ring 72 supported for rotation about a horizontal or elevation axis 74 by a pair of spaced apart arms 76 projecting from the front wall 26 of the support 24 and attached to the ring 72 by diametrically opposed pivot pins 78. The end 52 of the collimator is supported by the ring 72 by means of a pair of spaced apart arms 80 projecting from the end wall 52 and attached to the ring 72 by diametrically opposed pivot pins 82 extending along a vertical or azimuth axis 84 perpendicular to the elevation axis 74.

The collimator 16 is pivoted about the pivot point 70 by means of the actuator 20 that may be interposed between a bracket 90 on the fixed base 12 and the closed end wall 56. The actuator 20 preferably comprises a two-axis drive including a first motor 92 for pivoting the collimator about the horizontal or elevation (EL) axis 74 passing through the pivot point 70 and a second motor 94 for pivoting the collimator 16 about the vertical or azimuth (AZ) axis 84 also passing through the pivot point 70. The first or elevation motor 92 is coupled to an elevation encoder 92 providing an encoded, preferably digital, signal at an output 98 indicating the angular displacement of the collimator about the elevation axis 74 from a 0,0 AZ/EL reference. Similarly, the second or azimuth motor 94 is coupled to an azimuth encoder 100 providing an encoded, preferably digital, signal at an output 102 indicating the angular displacement of the collimator 16 about the azimuth axis 84 from the 0,0 reference. The motors 92 and 94 preferably comprise digitally controlled stepper motors for their accuracy and fine resolution.

Secured to the collimator housing 50 and projecting outwardly therefrom adjacent to the side window 64 is a platform 110 carrying a pinhole target 112 providing a point light source. Light emitted from the target 112 is transmitted through a beam splitter 114 along the optical axis 68 perpendicular to the collimator's optical axis 62 and is incident upon the flat secondary mirror 66 which redirects the light to the primary mirror 58 to provide an alignment or boresighting target.

The platform 110 also carries an optical imager preferably in the form of a CCD camera 118 having a photosensitive surface 120 positioned at the focal plane of the collimator. The photosensitive surface 120 (FIG. 10) may have a field of view of, for example, 6×4 milliradians. This field of view is limited in relation to the entire range of motion of the collimator, which may be at least ±10 milliradians. The photosensitive surface may comprise a pixel array having, for example, 320×240 pixels. Each side of the array may subtend a predetermined angle of, for example, 0.3° or 6 milliradians in which case the angular interval between adjacent pixels is 18 microradians.

The camera 118 has an output 122 connected to a computer 124. The computer 124 has outputs 128 and 130 electrically connected to inputs 129 and 131 of the elevation and azimuth motors 92 and 94, respectively, and inputs 132 and 134 that receive displacement information from the encoders 96 and 100, respectively.

The desired relative movement between the collimator 16 and the EO system 14 may be achieved by moving the collimator relative to the EO system (as already described), or by moving the EO system 14 relative to the collimator. For example, FIG. 1 shows in schematic form an alternative arrangement comprising an actuator 104 connected to the EO system 14 for moving the EO system relative to the collimator 16 which may be secured to the base 12. Preferably, the actuator 104 comprises a 2-axis drive, of the kind already described, for pivoting the EO system 14 about the pivot point 70. The actuator 104 and an associated encoder means 106 are coupled to a computer 108 in turn connected to receive output signals from the camera 118, as before. It will be equally evident that both the collimator and the EO system may be movably mounted on the base 12.

Figure 6:
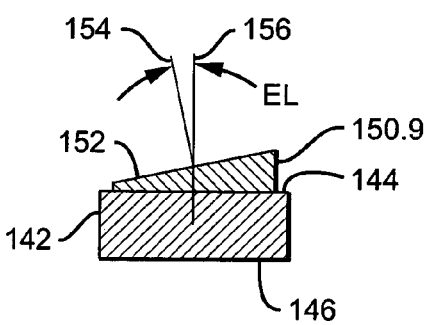
FIG. 6 is a cross section view of one of the mirror elements of the mirror assembly of FIG. 5, as seen along the line 6—6 in FIG. 5.
Figure 7:
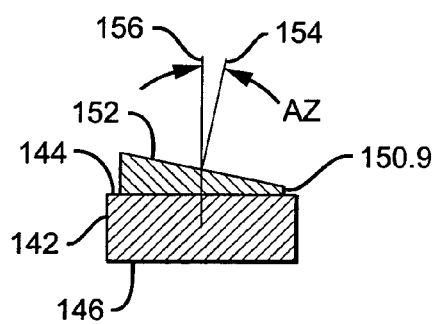
FIG. 7 is a cross section view of the mirror element shown in FIG. 6 as seen along the line 7—7 in FIG. 5.
Figure 8:
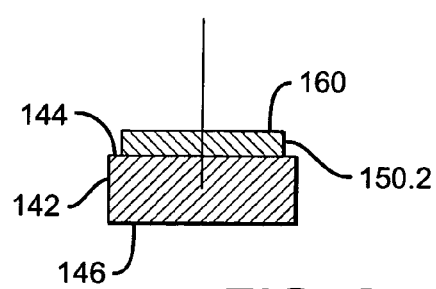
FIG. 8 is a cross section view of one of the reference mirror elements of the mirror assembly of FIG. 5, as seen along the line 8—8 in FIG. 5.

The multi-element mirror assembly 22 is mounted on a front reference surface 140 of the front wall 26 of the EO system support. The mirror assembly 22 comprises a support structure or frame 142 that may have various configurations. In the specific, preferred embodiment shown in FIG. 5, the frame 142 is in the shape of an annulus or ring having planar, parallel front and rear surfaces 144 and 146, respectively, and a clear aperture 148 having a diameter of 10 inches in the particular embodiment under consideration. The aperture has a central axis 149 normal to the surfaces 144 and 146. It will be apparent that the frame 142 of the mirror assembly 22 may have other configurations including but not limited to square, rectangular, and so forth. The planar rear surface 146 of the frame engages the front reference surface 140 of the front wall of the EO system support. The frame is positioned relative to the front wall of the support so that its aperture 148 is in alignment with the aperture 32 in the front wall 26 of the support 24 and concentric with the axis 33. Mounted on the front planar surface 144 of the frame 142 is a mirror array 150 comprising a plurality of small, individual mirrors 150.1 to 150.18 each of which, in the specific embodiment shown, has a generally circular shape. It will be evident that the mirrors 150.1 to 150.18 may have other shapes including but not limited to square, rectangular, hexagonal, and so forth. Except for the mirrors 150.1 and 150.2, each of the mirror elements has a reflecting surface that is oriented in a specific angular direction that is slightly different than the angular directions of the reflecting surfaces of the remaining mirror elements. FIGS. 6 and 7 show cross sections of the individual mirror element 150.9 taken by way of example. The mirror element 150.9 has a reflecting surface 152. The angular orientation of a line 154 perpendicular to the reflecting surface 152 may be measured in degrees of azimuth and elevation from an axially-extending line 156 perpendicular to the front surface 144 of the frame 142. The angular orientations of the lines perpendicular to the reflecting surfaces of the various mirror elements 150.1–150.18 of the mirror array 150 are set forth in the table of FIG. 9 in terms of their azimuth (AZ) and elevation (EL) angle components, in both degrees and milliradians (mrad). It will be seen from the table of AZ/EL angles for the various mirrors that except for the mirrors 150.1 and 150.2, a given mirror has an angular orientation defined by a unique combination of AZ and EL angles that identifies that mirror, and only that mirror. The angular orientations of these mirror elements are stored in the memory of the computer 124. The diametrically opposed mirror elements 150.1 and 150.2 comprise identical reference mirrors. FIG. 8 is a cross section of the reference mirror element 150.2, taken as representative. The element 150.2 has a reflecting surface 160 that is parallel with the front surface 144 of the frame 142. The two co-planar reference mirrors 150.1 and 150.2 can be used to run two self-test modes. When the system is running in the self-test mode, it provides two reflected returns from the reference mirror elements 150.1 and 150.2 that may be used to evaluate collimator image quality (camera spot size) and collimator focus (parallax).

Figure 5:
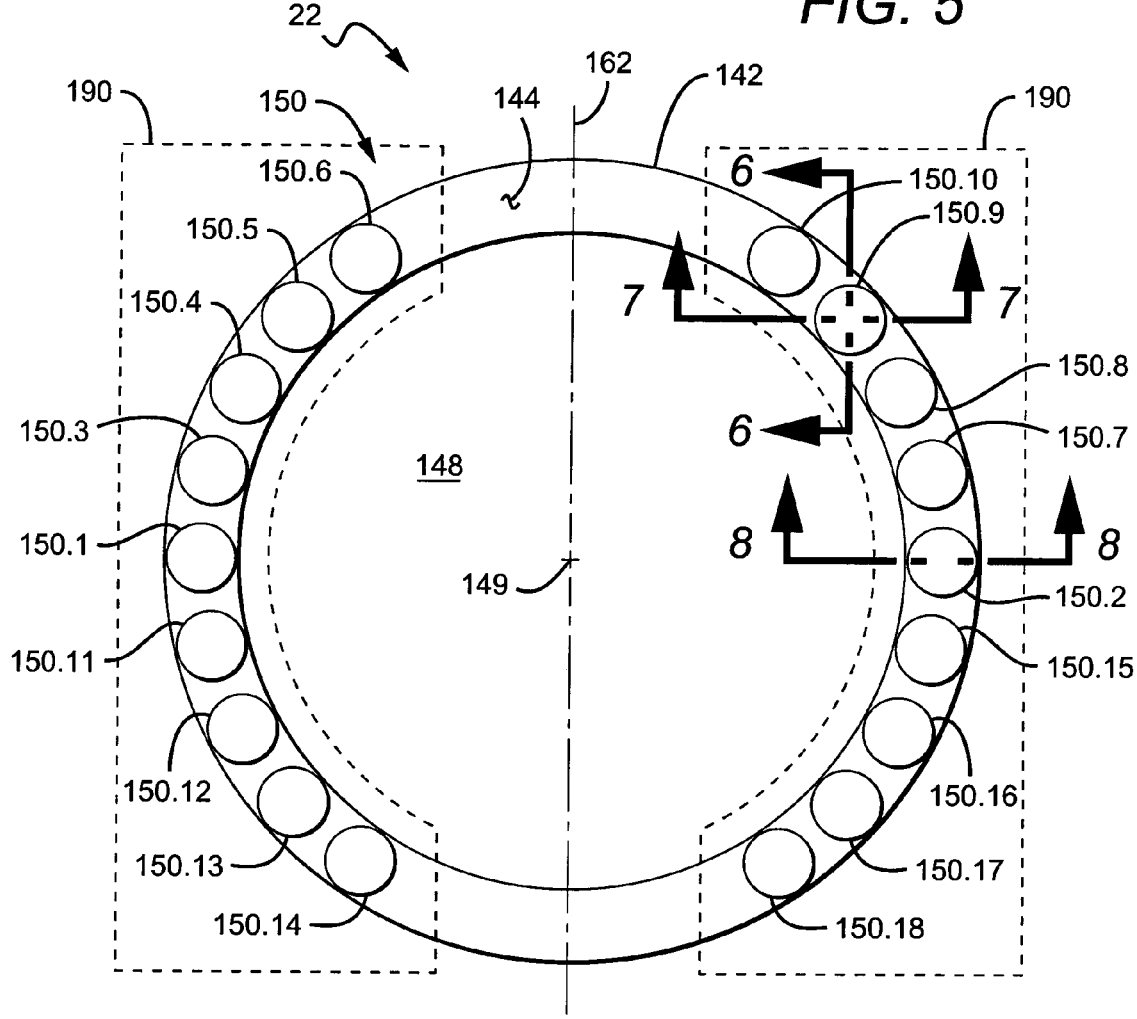
FIG. 5 is a front elevation view of a specific, exemplary embodiment of a multi-element mirror assembly forming part of the present invention.
Figure 11:
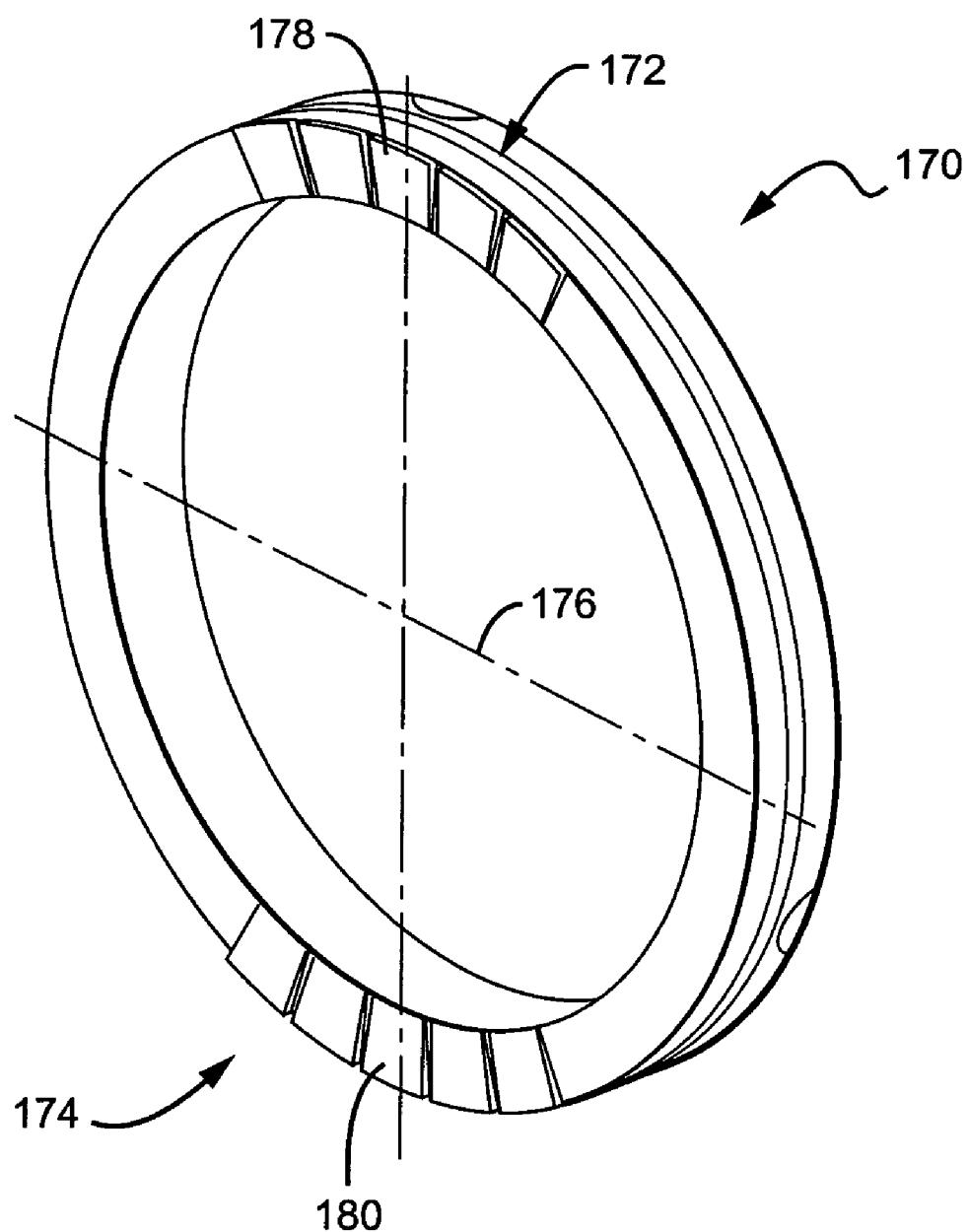
FIG. 11 is a perspective view of an alternative embodiment of the multi-element mirror assembly of the present invention.

In the embodiment under consideration, the eighteen mirror elements of the mirror assembly 22 are arranged in two groups of nine mirrors each, the groups being disposed symmetrically about a vertical, central plane 162, as seen in FIG. 5. Other mirror arrangements, both in the number and placement of the mirror elements, may be used. For example, FIG. 11 shows an alternative mirror assembly 170 having two mirror element groups 172 and 174 each with five identical mirror elements having square or rectangular shapes. The mirror element groups 172 and 174 are positioned symmetrically about a horizontal central axis 176, with diametrically opposed mirror elements 178 and 180 serving as co-planar reference mirrors and the remaining mirror elements having unique reflecting angles, as already explained. Generally, the required number of individual mirror elements will depend on the fields of view of the camera and the collimator, the amount of required motion of the collimator relative to the EO system and the required angular resolution.

Returning to FIGS. 1 and 2, the outer diameter of the mirror assembly 22 is such that light reflected from the primary mirror 58 will pass through the collimator's exit aperture 54 and the universal joint ring 72 to illuminate the mirror array 150. It will be understood that since the mirror elements of the array 150 face the collimator, light from the collimator will be retroreflected from the array 150 back into the collimator.

As shown in FIGS. 1, 2 and 5, the mirror array 150 of the mirror assembly 22 may be covered by a bilateral shutter 190 that is movable into position in front of the mirror elements so as to intercept and block light from the collimator.

Figures 9, 10:
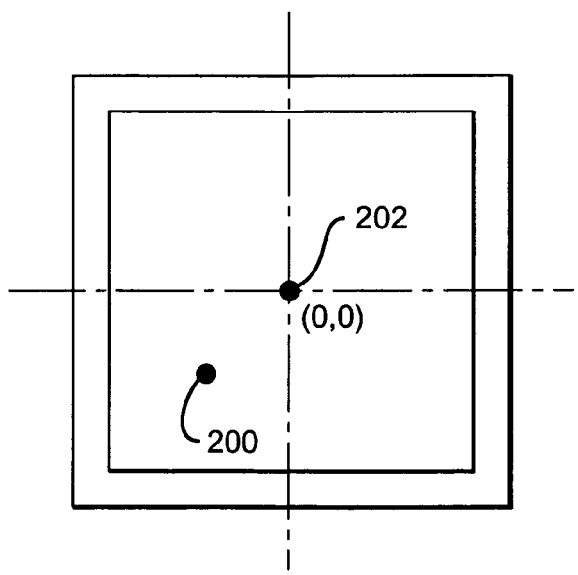
FIG. 9 is a table showing the elevation and azimuth angles of various ones of the mirror elements of the mirror assembly of FIG. 5.
FIG. 10 is a plan view of the photosensitive surface of a focal plane array CCD camera forming part of the system of the present invention.

In the use of the alignment system 10 employing the mirror assembly 22, a pinhole target projected into the collimator 16 will be reflected by each of the individual mirror elements of the array 150 back into the collimator. The reflected image of the pinhole target from at least one of the individual mirror elements is captured by the focal plane detector array 120 of the CCD camera 118. The particular mirror element reflecting the light captured by the focal plane array will depend on the angular position of the collimator, and that particular mirror element can be identified based on the mirror element orientation data stored in computer memory. The camera 118 will see the reflection of the pinhole target as a bright spot 200 (FIG. 10). The angular field of view of the camera, the number of individual mirror elements on the mirror assembly 22 and the angular interval between adjacent mirror elements are chosen so that the camera will always see a reflection of the pinhole target from at least one of the individual mirror elements for all AZ/EL positions within the system's range. The computer 124 continuously determines the pointing direction of the collimator by comparing the return images of the pinhole target to coarse pointing information it receives from the azimuth and elevation encoders 96 and 100. In effect, the azimuth and elevation mechanical encoders provide coarse pointing position information, while the optical feedback system (which includes the mirror assembly 22 directly coupled to the EO system) provides fine resolution via optical feedback. The optical feedback loop provides an indication of the actual collimator pointing direction far beyond the capabilities of mechanical encoding alone. The backlash, hysteresis, and wear that characterize mechanical positioning systems are eliminated.

In addition to the reflections from the individual elements of the mirror array 150, the focal plane array camera 118 will detect a reflection of the pinhole target from the reference mirror 34 mounted on the EO system support 24. The shutter 180 associated with the mirror assembly 22 prevents light from the collimator from reaching the mirror elements of the array 150 during the EO system alignment process utilizing the fixed reference mirror 34. With the shutter 180 interposed between the exit aperture 54 of the collimator and the mirror array 150, the only reflection of the pinhole target will be from the EO system reference mirror 34 seen as a bright spot 202 (FIG. 10). The computer 124 calculates the direction in which the collimator is pointed relative to the reference mirror 34 and defines and stores in memory this information as the 0,0 AZ/EL reference state. The shutter 180 can then be retracted and the mirror assembly 22 utilized to accurately determine the azimuth and elevation pointing direction of the collimator, as already described. During this operation, the shutter 38 may be moved in front of the EO system reference mirror 34 to block light from the collimator from reaching that mirror. Alignment of the collimator 16 with the EO system 14 is achieved by comparing the positions of the light spots 200 and 202 on the photosensitive surface of the camera, generating an error signal based on that comparison, and, in response to the error signal, adjusting the angular orientation or pointing direction of the collimator relative to the EO system to align the two, with the goal of driving the error signal to zero.

While several illustrative embodiments of the invention have been shown and described, numerous variations and alternative embodiments will occur to those skilled in the art. Such variations and alternative embodiments are contemplated, and can be made without departing from the spirit and scope of the invention as defined in the appended claims.

What is claimed is:

1. A method of aligning an electro-optical (EO) system with a collimator, the EO system and the collimator each having an optical axis, the method comprising:
    illuminating a plurality of mirror elements with light from the collimator, each of the plurality of mirror elements being oriented so as to reflect light from the collimator at a predetermined, unique angle relative to the optical axis of the EO system;
    directing a beam of light reflected from one of the plurality of mirror elements to form a light spot on a photosensitive surface;
    determining the relative orientation of the optical axes of the collimator and the EO system by comparing the position of the light spot on the photosensitive surface with a reference position; and
    aligning said optical axes based on said determination.

2. The method of claim 1 further comprising:
    generating an error signal based on the comparison of the position of the light spot with the reference position; and
    adjusting the orientation of the collimator relative to the EO system to align the optical axes thereof in response to said error signal.

3. The method of claim 1 further comprising:
    generating an error signal based on the comparison of the position of the light spot with the reference position; and adjusting the orientation of the EO system relative to the collimator to align the optical axes thereof in response to said error signal.

4. The method of claim 1 in which the reference position is defined by a reference light spot formed on the photosensitive surface by:
projecting light from the collimator onto a reference mirror mounted on the EO system; and
directing a beam of light reflected from the reference mirror to form said reference light spot on the photosensitive surface.

5. The method of claim 4 further comprising:
blocking light from the collimator from reaching the plurality of mirror elements during the step of forming the reference light spot.

6. The method of claim 4 further comprising:
blocking light from the collimator from reaching the reference mirror during the step of illuminating the plurality of mirror elements with light from the collimator.

7. A method of aligning an electro-optical (EO) system with a collimator, the EO system and the collimator each having an optical axis, the method comprising:
illuminating a plurality of mirror elements with light from the collimator, each of the plurality of mirror elements being oriented so as to reflect light from the collimator at a predetermined, unique angle relative to the optical axis of the EO system;
directing a beam of light reflected from one of the plurality of mirror elements to produce a light spot on a photosensitive surface;
determining the approximate angular orientation of the optical axis of the collimator relative to the optical axis of the EO system by determining which one of the plurality of mirror elements is producing the light spot on the photosensitive surface;
determining more precisely the angular orientation of the optical axis of the collimator relative to the optical axis of the EO system by comparing the position of the light spot on the photosensitive surface with the position of a reference light spot on the photosensitive surface;
generating an error signal based on said comparison; and
in response to said error signal, adjusting the angular orientation of the collimator relative to the EO system to align the optical axes thereof, with the goal of reducing the magnitude of the error signal to zero.

8. The method of claim 7 in which the reference light spot is formed by:
projecting light from the collimator onto a reference mirror mounted on the EO system; and
directing a beam of light reflected from the reference mirror to form the reference light spot.

9. The method of claim 8 further comprising:
blocking light from the collimator from reaching the plurality of mirror elements during the step of forming the reference light spot.

10. The method of claim 8 further comprising:
blocking light from the collimator from reaching the reference mirror during the step of illuminating the plurality of mirror elements with light from the collimator.

11. A system for optically aligning an electro-optical (EO) apparatus relative to a collimator, the collimator being adapted to project collimated light through an exit aperture and for receiving light through said aperture, the system comprising:
a mirror assembly mounted on the EO apparatus, the mirror assembly comprising a plurality of mirror elements positioned to receive light from the exit aperture of the collimator and to reflect the light back into the collimator through said aperture, each of the mirror elements having a reflecting surface oriented at a predetermined, unique angle;
an actuator for displacing the collimator and the EO system relative to each other;
a camera having a photosensitive surface positioned at a focal plane of the collimator;
a light source; and
a computer connected to control the actuator and to receive signals from the camera, whereby the collimator is adapted to direct light from the light source through the exit aperture of the collimator to illuminate the plurality of mirror elements of the mirror assembly, light reflected from at least one of the mirror elements being incident as a light spot on the photosensitive surface of the camera, the computer being adapted to (1) compare the position of the light spot on the photosensitive surface with a reference position, (2) generate an error signal based on the comparison, and (3) align the collimator and the EO apparatus by driving the actuator in response to the error signal with the goal of reducing the magnitude of the error signal to zero.

12. The system of claim 11 wherein:
the actuator is operable to displace the collimator relative to the EO apparatus.

13. The system of claim 11 wherein:
the actuator is operable to displace the EO apparatus relative to the collimator.

14. The system of claim 11 wherein:
the actuator is operable to angularly displace the collimator and the EO apparatus relative to each other about a pivot point.

15. The system of claim 14 wherein:
the actuator comprises azimuth and elevation motors.

16. The system of claim 15 wherein:
the collimator has opposite ends, the exit aperture being disposed at one of the ends and the actuator being disposed at the other end.

17. The system of claim 16 wherein:
the end of the collimator having the exit aperture is connected by a universal coupler to the EO apparatus.

18. The system of claim 11 further comprising:
encoder means coupled to the actuator for providing to the computer a coarse indication of the pointing direction of the collimator relative to the EO apparatus.

19. The system of claim 11 wherein:
the EO apparatus includes a reference mirror positioned to reflect light received from the collimator back into the collimator to produce on the photosensitive surface of the camera a light spot defining said reference position.

20. The system of claim 19 further comprising:
a shutter selectively movable to block light from the collimator from reaching the reference mirror.

21. The system of claim 11 further comprising:
a shutter selectively movable to block light from the collimator from reaching the plurality of mirror elements of the mirror assembly.

22. The system of claim 11 wherein:
the plurality of mirror elements of the mirror assembly include a pair of coplanar reference mirror elements for evaluating collimator image quality and collimator focus.

* * * * *